US012361316B2

(12) United States Patent
Sloane et al.

(10) Patent No.: US 12,361,316 B2
(45) Date of Patent: Jul. 15, 2025

(54) SYSTEM FOR IMPLEMENTING DYNAMIC DATA OBFUSCATION USING PATTERN RECOGNITION TECHNIQUES

(71) Applicant: BANK OF AMERICA CORPORATION, Charlotte, NC (US)

(72) Inventors: Brandon Sloane, Indian Land, SC (US); Jinyoung Nathan Kim, Charlotte, NC (US); Adriana Tache, Falls Church, VA (US); Charles Edward Dudley, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1075 days.

(21) Appl. No.: 17/172,959

(22) Filed: Feb. 10, 2021

(65) Prior Publication Data
US 2022/0253744 A1 Aug. 11, 2022

(51) Int. Cl.
G06N 20/00 (2019.01)
G06F 16/28 (2019.01)
(Continued)

(52) U.S. Cl.
CPC ........... *G06N 20/00* (2019.01); *G06F 16/285* (2019.01); *G06F 18/22* (2023.01); *G06F 18/24147* (2023.01); *G06F 21/6218* (2013.01)

(58) Field of Classification Search
CPC ......... G06N 20/00; G06F 16/28; G06F 18/22; G06F 18/24147; G06F 21/6218
See application file for complete search history.

(56) References Cited

U.S. PATENT DOCUMENTS 8,001,607 B2 8/2011 Stull et al.
8,347,396 B2 1/2013 Grigsby
(Continued)

FOREIGN PATENT DOCUMENTS

| WO | 2001001260 A3 | 7/2002 |
| WO | 2009139650 A1 | 11/2009 |
| WO | 2020165756 A1 | 8/2020 |

OTHER PUBLICATIONS

Smallman, A. C. (2020). Analysis of Time Activity Data Characteristics and Data Degradation in Digital Forensics (Doctoral dissertation, George Mason University). (Year: 2020).*
(Continued)

*Primary Examiner* — Michael J Huntley
*Assistant Examiner* — Maggie Thanh Maido
(74) *Attorney, Agent, or Firm* — Moore & Van Allen PLLC; Anup Iyer (57) ABSTRACT

Systems, computer program products, and methods are described herein for implementing dynamic data obfuscation using pattern recognition techniques. The present invention is configured to electronically receive one or more data artifacts; electronically receive one or more masked data artifacts; initiate one or more machine learning algorithms on the one or more data artifacts and the one or more masked data artifacts; determine, using the one or more machine learning algorithms, a first set of patterns associated with the one or more data artifacts and a second set of patterns associated with the one or more masked data artifacts; determine a similarity index between the first set of patterns and the second set of patterns; and compare the similarity index with a predetermined threshold; determine one or more alternate data obfuscation algorithms; and implement the one or more alternate data obfuscation algorithms on the one or more data artifacts.

17 Claims, 2 Drawing Sheets

(51) Int. Cl.
*G06F 18/22* (2023.01)
*G06F 18/2413* (2023.01)
*G06F 21/62* (2013.01)

(56) References Cited

U.S. PATENT DOCUMENTS

| | | | |
|---|---|---|---|
| 8,812,524 | B2 | 8/2014 | Chen et al. |
| 8,949,209 | B2 | 2/2015 | Khin et al. |
| 8,959,654 | B2 | 2/2015 | Avrahami et al. |
| 9,043,929 | B2 | 5/2015 | Avrahami et al. |
| 9,223,995 | B1 | 12/2015 | Lavinio |
| 9,251,339 | B2 | 2/2016 | Bullis et al. |
| 9,298,878 | B2 | 3/2016 | Guirguis et al. |
| 9,311,369 | B2 | 4/2016 | Pattabhi |
| 9,646,143 | B2 | 5/2017 | Lavinio |
| 9,716,692 | B2 | 7/2017 | Cismas et al. |
| 9,753,931 | B2 | 9/2017 | Burshteyn |
| 9,946,895 | B1 | 4/2018 | Kruse et al. |
| 10,037,330 | B1 | 7/2018 | Burshteyn |
| 10,102,398 | B2 | 10/2018 | Neergaard |
| 10,216,958 | B2 | 2/2019 | Avrahami et al. |
| 10,289,816 | B1 | 5/2019 | Malassenet |
| 10,289,868 | B2 | 5/2019 | Jagadish et al. |
| 10,298,545 | B2 | 5/2019 | Boivie et al. |
| 10,303,559 | B2 | 5/2019 | Vijayan |
| 10,860,732 | B2 | 12/2020 | Guirguis et al. |
| 10,929,556 | B1 | 2/2021 | Kurian |
| 11,003,783 | B1 | 5/2021 | Ursachi |
| 11,238,138 | B1 | 2/2022 | Ancheta |
| 2006/0195703 | A1 | 8/2006 | Jakubowski |
| 2008/0240425 | A1 | 10/2008 | Rosales |
| 2011/0270837 | A1 | 11/2011 | Raj et al. |
| 2012/0079281 | A1 | 3/2012 | Lowenstein |
| 2012/0239433 | A1* | 9/2012 | Kenedy ............... G16H 10/40 705/3 |
| 2012/0272329 | A1 | 10/2012 | Grammer et al. |
| 2013/0054650 | A1 | 2/2013 | O'Byrne |
| 2013/0104239 | A1 | 4/2013 | McLachlan |
| 2014/0019467 | A1 | 1/2014 | Itoh |
| 2014/0188514 | A1 | 7/2014 | Balignasay et al. |
| 2015/0074392 | A1 | 3/2015 | Boivie |
| 2015/0098564 | A1 | 4/2015 | Chamley et al. |
| 2016/0092871 | A1 | 3/2016 | Gordon |
| 2016/0300075 | A1 | 10/2016 | Stankiewicz et al. |
| 2018/0060612 | A1 | 3/2018 | Gladwin |
| 2018/0248887 | A1 | 8/2018 | Sayed |
| 2020/0034573 | A1 | 1/2020 | Pulkus |
| 2020/0082120 | A1* | 3/2020 | Richardson ........... G06F 21/604 |
| 2020/0159907 | A1 | 5/2020 | Johnson |
| 2020/0250139 | A1* | 8/2020 | Muffat ............... G06V 30/1988 |
| 2020/0265159 | A1 | 8/2020 | Schmatz |
| 2020/0265532 | A1* | 8/2020 | Lee ..................... G06F 21/6245 |
| 2020/0327252 | A1 | 10/2020 | McFall |
| 2020/0364801 | A1 | 11/2020 | Basra |
| 2021/0012017 | A1 | 1/2021 | Wu |
| 2021/0097150 | A1 | 4/2021 | Justusson |
| 2021/0133557 | A1* | 5/2021 | Iyoob .................... G06F 40/205 |
| 2021/0150038 | A1 | 5/2021 | Valecha |
| 2021/0158171 | A1* | 5/2021 | Rausch ............... H04L 67/1097 |
| 2021/0174347 | A1 | 6/2021 | Rose |
| 2021/0398128 | A1 | 12/2021 | Huber, Jr. |
| 2022/0075899 | A1 | 3/2022 | Richardson |
| 2022/0138325 | A1* | 5/2022 | Todd ....................... G06F 21/54 726/26 |
| 2022/0229913 | A1 | 7/2022 | Mack |
| 2022/0253544 | A1 | 8/2022 | Sloane |
| 2023/0107191 | A1 | 4/2023 | Wong |

OTHER PUBLICATIONS

Christian Pilato et al., "TAO: Techniques for Algorithm-Level Obfuscation during High-Level Synthesis", 2018 55th ACM/ESDA/IEEE Design Automation Conference (DAC), Jun. 2018, pp. 1-6.
Rajat Subhra Chakraborty et al., "Hardware protection and authentication through netlist level obfuscation", 2008 IEEE/ACM International Conference on Computer-Aided Design, Nov. 2008, pp. 1-4.
Riboni et al., "Obfuscation of Sensitive Data for Incremental Release of Network Flows", IEEE/ACM Transactions on Networking, vol. 23, No. 2, Apr. 2014.

* cited by examiner

SYSTEM FOR IMPLEMENTING DYNAMIC DATA OBFUSCATION USING PATTERN RECOGNITION TECHNIQUES

FIELD OF THE INVENTION

The present invention embraces a system for implementing dynamic data obfuscation using pattern recognition techniques.

BACKGROUND

Data management is the practice of managing data as a valuable resource to unlock its potential for an entity. Managing data effectively requires having a data strategy and reliable methods to access, integrate, store and secure data for analytics and use. Securing such data typically involves limiting access to sensitive data using sufficient data security and information security practices designed to prevent unauthorized disclosure and access.

As part of the effort to protect sensitive data, there is a need for a system for implementing dynamic data obfuscation using pattern recognition techniques.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing dynamic data obfuscation using pattern recognition techniques is presented. The system comprising: at least one non-transitory storage device; and at least one processing device coupled to the at least one non-transitory storage device, wherein the at least one processing device is configured to: electronically receive, from a first database, one or more data artifacts; electronically receive, from an obfuscated first database, one or more masked data artifacts; initiate one or more machine learning algorithms on the one or more data artifacts; determine, using the one or more machine learning algorithms, a first set of patterns associated with the one or more data artifacts; initiate the one or more machine learning algorithms on the one or more masked data artifacts; determine, using the one or more machine learning algorithms, a second set of patterns associated with the one or more masked data artifacts; determine a similarity index between the first set of patterns and the second set of patterns; and compare the similarity index with a predetermined threshold; determine one or more alternate data obfuscation algorithms based on at least comparing the similarity index with the predetermined threshold; and implement the one or more alternate data obfuscation algorithms on the one or more data artifacts.

In some embodiments, the at least one processing device is further configured to: implement one or more data obfuscation algorithms on the one or more data artifacts, wherein implementing further comprises obfuscating the one or more data artifacts to generate one or more masked data artifacts.

In some embodiments, the at least one processing device is further configured to: initiate the one or more machine learning algorithms on the one or more data artifacts, wherein each of the one or more data artifacts comprises at least a data record, metadata, boot structure, and one or more data indexes; classify, using the one or more machine learning algorithms, the one or more data artifacts into one or more class labels; and determine the first set of patterns associated with the one or more data artifacts based on at least classifying the one or more data artifacts into the one or more class labels.

In some embodiments, the at least one processing device is further configured to: initiate the one or more machine learning algorithms on the one or more masked data artifacts; classify, using the one or more machine learning algorithms, the one or more masked data artifacts into the one or more class labels; and determine the second set of patterns associated with the one or more data artifacts based on at least classifying the one or more masked data artifacts into the one or more class labels.

In some embodiments, the at least one processing device is further configured to: initiate the one or more machine learning algorithms on the one or more data artifacts; classify, using the one or more machine learning algorithms, the one or more data artifacts into one or more cluster groups; and determine the first set of patterns associated with the one or more data artifacts based on at least classifying the one or more data artifacts into the one or more cluster groups.

In some embodiments, the at least one processing device is further configured to: initiate the one or more machine learning algorithms on the one or more masked data artifacts; classify, using the one or more machine learning algorithms, the one or more masked data artifacts into one or more cluster groups; and determine the first set of patterns associated with the one or more masked data artifacts based on at least classifying the one or more masked data artifacts into the one or more cluster groups.

In some embodiments, the at least one processing device is further configured to: determine the similarity index between the first set of patterns and the second set of patterns generated in response to implementing the one or more alternate data obfuscation algorithms on the one or more data artifacts; determine that the similarity index is lower than the predetermined threshold; and iteratively implement the one or more alternate data obfuscation algorithms on the one or more data artifacts until the similarity index between the first set of patterns and the second set of patterns generated in response to implementing the one or more alternate data obfuscation algorithms on the one or more data artifacts is greater than the predetermined threshold.

In another aspect, a computer program product for implementing dynamic data obfuscation using pattern recognition techniques is presented. The computer program product comprising a non-transitory computer-readable medium comprising code causing a first apparatus to: electronically receive, from a first database, one or more data artifacts; electronically receive, from an obfuscated first database, one or more masked data artifacts; initiate one or more machine learning algorithms on the one or more data artifacts; determine, using the one or more machine learning algorithms, a first set of patterns associated with the one or more data artifacts; initiate the one or more machine learning algorithms on the one or more masked data artifacts; determine, using the one or more machine learning algorithms, a second set of patterns associated with the one or more masked data artifacts; determine a similarity index between the first set of patterns and the second set of patterns; and compare the similarity index with a predetermined threshold; determine one or more alternate data obfuscation algorithms based on at least comparing the similarity index with the predetermined threshold; and implement the one or more alternate data obfuscation algorithms on the one or more data artifacts.

In yet another aspect, a method for implementing dynamic data obfuscation using pattern recognition techniques is presented. The method comprising: electronically receiving, from a first database, one or more data artifacts; electronically receiving, from an obfuscated first database, one or more masked data artifacts; initiating one or more machine learning algorithms on the one or more data artifacts; determining, using the one or more machine learning algorithms, a first set of patterns associated with the one or more data artifacts; initiating the one or more machine learning algorithms on the one or more masked data artifacts; determining, using the one or more machine learning algorithms, a second set of patterns associated with the one or more masked data artifacts; determining a similarity index between the first set of patterns and the second set of patterns; and comparing the similarity index with a predetermined threshold; determining one or more alternate data obfuscation algorithms based on at least comparing the similarity index with the predetermined threshold; and implementing the one or more alternate data obfuscation algorithms on the one or more data artifacts.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "data obfuscation" or "data masking" may refer to the process of hiding or obscuring original data artifacts with modified content (characters or other data artifacts) to ensure privacy. In some embodiments, data masking algorithmically substitutes realistic but false data artifacts for the original data artifacts. The resulting masked data artifacts will continue to meet the requirements of a system designed to test or still work with the masked results. In embodiments contemplated herein, data obfuscation algorithms used to mask the data artifacts are dynamic and reversible, i.e., the data obfuscation algorithms are capable of transforming the data artifacts while preserving the integrity of the data. For example, shuffling-based data obfuscation algorithms allow for randomly switching values within a column, substitution-based data obfuscation algorithms allow for a given value to be mapped to an equivalent value in a secure lookup table. The legitimate data artifacts remain in the data repository and are accessible when authorized by the system described herein. During deobfuscation or unmasking process, the original data is shuffled or substituted (deobfuscated) in real-time on-demand to make the contents unmasked. Only an authorized user may be able to see the legitimate data artifacts. For purposes of the invention, "obfuscated data artifact" or "masked data artifact" may refer to (unmasked) data artifacts that have been masked using obfuscation algorithms.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Embodiments of the invention relate to the use of artificial intelligence and machine learning techniques to analyze the efficacy of obfuscation algorithms implemented on data artifacts. Even though data artifacts are masked, and their values obfuscated, patterns that emerge from analyzing obfuscated data artifacts may provide valuable information to potentially unauthorized parties. Therefore, there is a need for dynamically choosing the most effective data obfuscation algorithms for implementation. By using machine learning techniques, the present invention provides the functional benefit of detecting patterns in both the masked and unmasked data artifacts. If the patterns derived from the masked and unmasked data artifacts are similar, the obfuscation algorithm used to mask the data artifacts may be determined as being inadequate. Accordingly, the present invention provides the functional benefit of iteratively comparing patterns derived from the masked data artifacts and the unmasked data artifacts and identifying alternate data obfuscation algorithms for implementation until the similarity index, or any applicable similarity score is below a predetermined threshold.

Figure 1:
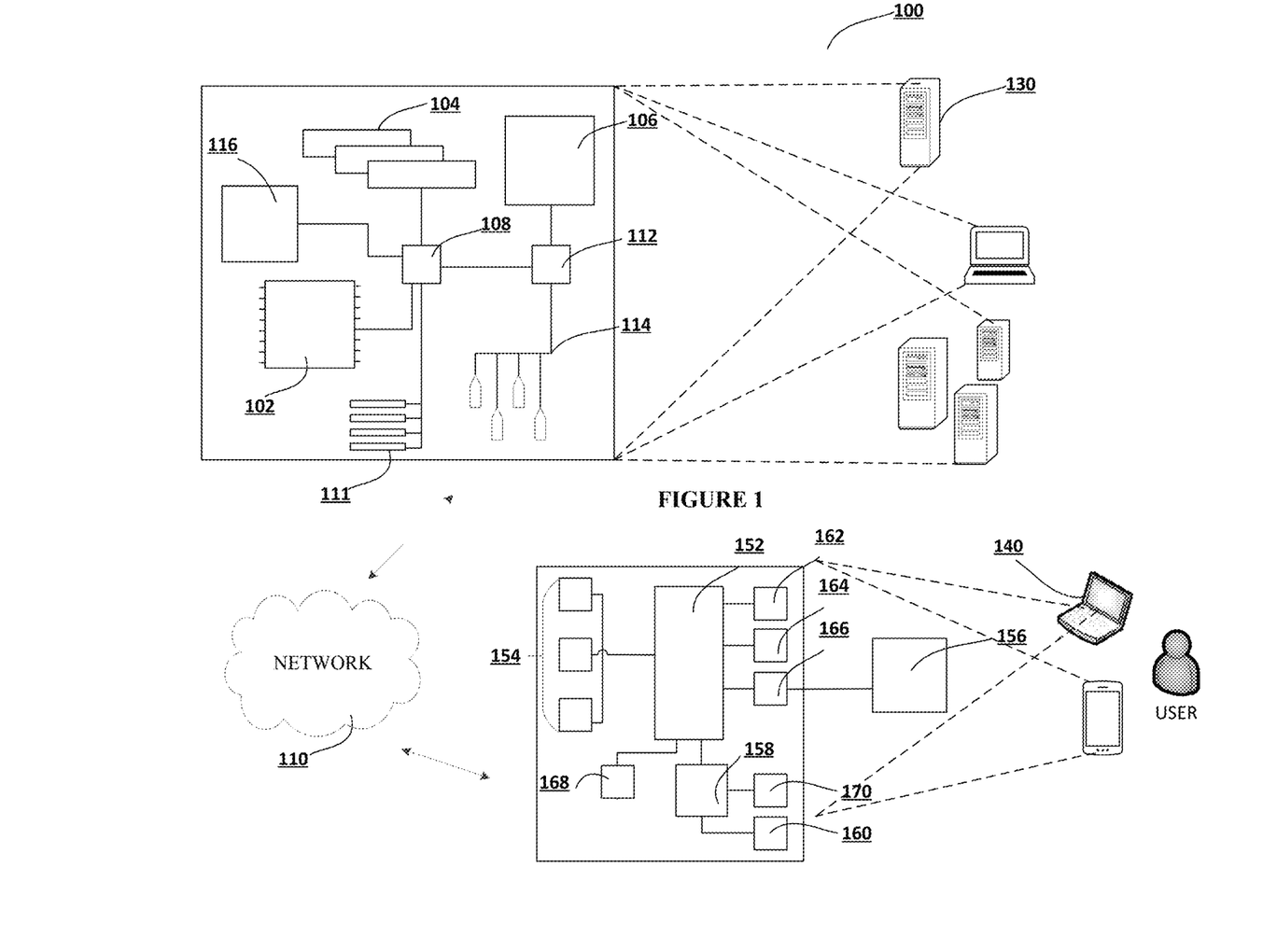
FIG. 1 illustrates technical components of a system for implementing dynamic data obfuscation using pattern recognition techniques, in accordance with an embodiment of the invention.

FIG. 1 presents an exemplary block diagram of the system environment for implementing dynamic data obfuscation using pattern recognition techniques 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

Figure 2:
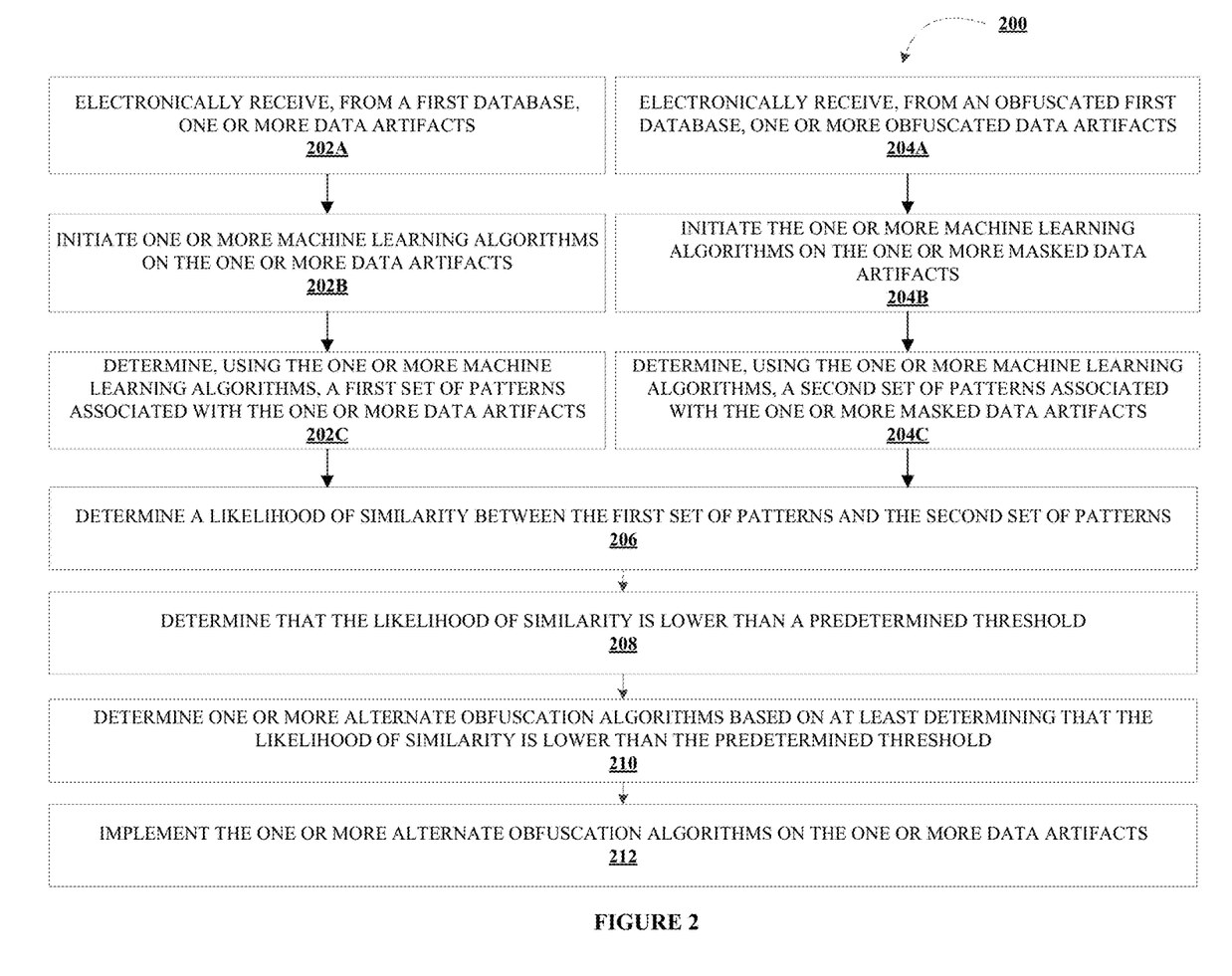
FIG. 2 illustrates a process flow for implementing dynamic data obfuscation using pattern recognition techniques, in accordance with an embodiment of the invention.

FIG. 2 illustrates a process flow for implementing dynamic data obfuscation using pattern recognition techniques 200, in accordance with an embodiment of the invention. As shown in block 202A, the process flow includes electronically receiving, from a first database, one or more data artifacts. In some embodiments, each of the one or more data artifacts comprises at least a data record, metadata, data boot structure, and one or more data indexes.

Next, as shown in block 202B, the process flow includes initiating one or more machine learning algorithms on the one or more data artifacts. By initiating the machine learning algorithms on the data artifacts, the system may be configured to determine a first set of patterns (underlying patterns) in the data artifacts. In some embodiments, the system may be configured to implement supervised learning techniques to identify an underlying pattern within the data artifacts. In this regard, the system may be configured to implement a machine learning model to classify the data artifacts into predetermined class labels. As described herein, the machine learning model may refer to a mathematical model generated by machine learning algorithms based on training data, to make predictions or decisions without being explicitly programmed to do so. To generate the machine learning model, the system may be configured to electronically receive, from a computing device of a user, one or more classes (or class labels) for previously known and analyzed data artifacts with similar data characteristics as that of the data artifacts that are to be classified. In response to receiving the classes, the system may be configured generate a training dataset based on the previously known and analyzed data artifacts and the one or more classes. In response to generating the training dataset, the system may be configured to train, using the machine learning algorithm, the machine learning model to classify the one or more data artifacts into the one or more classes.

In some embodiments, the system may be configured to implement unsupervised learning techniques to identify an underlying pattern within the data artifacts. Unlike supervised learning techniques, no labels are given to the machine learning algorithms, leaving it on its own to find structure within the data artifacts. The goal in such unsupervised learning technique implementation is to discover groups of similar examples within the data artifacts as a cluster, where each cluster provides some information regarding the categories and classes present in the data. Each cluster group may be an organized group of data artifacts that are similar in some way. Accordingly, the system may be configured to classify, using the one or more machine learning algorithms, the one or more data artifacts into one or more cluster groups.

Next, as shown in block 202C, the process flow includes determining, using the one or more machine learning algorithms, a first set of patterns associated with the one or more data artifacts. In embodiments where supervised learning techniques are implemented, the system may be configured to determine the first set of patterns based on at least classifying the data artifacts into predetermined class labels. Data artifacts that are classified into the same class label may be similar in nature. In one example, in data artifacts that represent financial transactions, a transaction at electronic store 1 and a transaction at electronic store 2 may both be classified into a class label representing "electronics" based on prior transactions that were executed in other electronic stores. In another example, a transaction at restaurant 1 and transaction at restaurant 2 may both be classified into a class label representing "dining" based on prior transactions that were executed in other restaurants.

In embodiments where unsupervised learning techniques are implemented, the system may be configured to determine the first set of patterns by representing the cluster groups in a high dimensional vector space. In some embodiments, a cluster group may be a set of data artifacts such that a data artifact in a cluster group is closer (more similar) to the "center" of a cluster, than to the center of any other cluster group. The center of a cluster group is often a centroid, the average of all the points in the cluster group, or a medoid, the "most representative" point of a cluster. In some other embodiments, a cluster group may be a set of points such that a point in a cluster group is closer (or more similar) to one or more other points in the cluster group than to any point not in the cluster group. In still other embodiments, a cluster group may be a dense region of points, which is separated by low-density regions, from other regions of high density. In other words, a cluster group may be a set of data artifacts that are "similar" and data artifacts in other clusters are not "similar." By clustering the data artifacts into various cluster groups, one may be able to determine underlying data patterns such as dependence structure among the data artifacts based on various measures, such as data correlation.

As shown in block 204A, the process flow includes electronically receiving, from an obfuscated first database, one or more masked data artifacts. Next, as shown in block 204B, the process flow includes initiating the one or more machine learning algorithms on the one or more masked data artifacts. Next, as shown in block 204C, the process flow includes determining, using the one or more machine learning algorithms, a second set of patterns associated with the one or more masked data artifacts. Similar to determining the first set of patterns associated with the data artifacts, the system may be configured to implement same or similar machine learning algorithms to determine a second set of patterns associated with the masked data artifacts. As described herein, by implementing obfuscation algorithms on the first database, i.e., on the data artifacts stored therein, the system may be configured to generate the obfuscated first database with structurally similar but inauthentic versions of the data artifacts, i.e., masked data artifacts. However, a successful obfuscation technique must not only mask the actual data artifact, but also mask any underlying pattern that may be derived by collectively analyzing the data artifacts store in the first database. For example, by continuously classifying the financial transactions of the user into specific class labels, a regular spending pattern of the user may be extracted. If the masked versions of the financial transactions are also classified into the same class label as that of the legitimate financial transactions, one may be able to extract the regular spending pattern of the user, even though actual values in the financial transactions may be masked.

Next as shown in block 206, the process flow includes determining a similarity index between the first set of patterns and the second set of patterns. By determining the similarity index between the first set of patterns and the second set of patterns, the system may be configured to quantify the relatedness between the first database and the obfuscated first database. In this regard, the system may be configured to create a similarity function that quantifies the relatedness between the data artifacts stored in the first database and the corresponding masked data artifacts stored in the obfuscated first database. In embodiments contemplated herein, any applicable similarity score measure may be implemented to determine the similarity index. For example, in embodiments where supervised learning techniques are used to classify the data artifacts and the masked data artifacts into class labels, the similarity index may be determined based on at least number of instances where both the data artifact and the corresponding masked data artifact are classified into the same class label. In another example, in embodiments where unsupervised learning techniques are used to group the data artifacts and the masked data artifacts into cluster groups, the similarity index may be based on a distance measure (Euclidean, Manhattan, Minkowski, maximum, and/or the like) calculated between the cluster group associated with a set of data artifacts and the cluster group associated with the set of masked data artifacts corresponding to the set of data artifacts when represented in the same high dimensional vector space.

Next, as shown in block 208, the process flow includes comparing the similarity index with a predetermined threshold. Depending on the type of machine learning technique and/or similarity measure used, the results, and subsequent actions based on comparing the similarity index with the predetermined threshold, i.e., a user-defined tolerance level, may vary. In embodiments where the similarity index is calculated based on at least number of instances where both the data artifact and the corresponding masked data artifact are classified into the same class label, fewer instances where both the data artifact and the corresponding masked data artifact are classified into the same class label indicate dissimilarity, while a greater number of instances indicate similarity. In such cases, if the similarity index is lower than the predetermined threshold, it may be an indication that the obfuscation algorithms used to mask the first database (and the data artifacts stored therein) to generate the obfuscated first database (and the masked data artifacts stored therein) are adequate to protect the data artifacts from unauthorized users. On the other hand, if the similarity index is greater than the predetermined threshold, it may be an indication that the obfuscation algorithms used to mask the first database (and the data artifacts stored therein) to generate the obfuscated first database (and the masked data artifacts stored therein) are inadequate to protect the data artifacts from unauthorized users and need to be revisited.

In embodiments where the similarity index is calculated based on a distance measure calculated between the cluster group associated with a set of data artifacts and the cluster group associated with the set of masked data artifacts corresponding to the set of data artifacts, smaller distance indicates similarity, while larger distance indicates dissimilarity. In such cases, if the similarity index is greater than the predetermined threshold, it may be an indication that the obfuscation algorithms used to mask the first database (and the data artifacts stored therein) to generate the obfuscated first database (and the masked data artifacts stored therein) are adequate to protect the data artifacts from unauthorized users. On the other hand, if the similarity index is lower than the predetermined threshold, it may be an indication that the obfuscation algorithms used to mask the first database (and the data artifacts stored therein) to generate the obfuscated first database (and the masked data artifacts stored therein) are inadequate to protect the data artifacts from unauthorized users and need to be revisited.

Next, as shown in block 210, the process flow includes determining one or more alternate data obfuscation algorithms based on at least comparing the similarity index with the predetermined threshold. In some embodiments, the system may be configured to identify one or more alternate data obfuscation algorithms that are more computationally complex compared to the obfuscation algorithms previously used to mask the data artifacts. In some other embodiments, the system may be configured to identify one or more alternate data obfuscation algorithms that may be implemented iteratively on the data artifacts, increasing the overall computational complexity of the obfuscation. In some other embodiments, the system may be configured to determine a number of iterative implementations for the obfuscation algorithms previously used to mask the data artifacts to increase the overall computational complexity.

Next, as shown in block 212, the process flow includes implementing the one or more alternate data obfuscation algorithms on the one or more data artifacts. In some embodiments, the system may be configured to retrieve, from a data obfuscation repository, the one or more alternate data obfuscation algorithms. In response, the system may be configured to implement the one or more alternate data obfuscation algorithms on the one or more data artifacts. By implementing the one or more alternate data obfuscation algorithms, the system may be configured to obfuscate/mask the one or more data artifacts to generate one or more masked data artifacts. In some embodiments, the system may be configured to determine whether the implementation of the alternate obfuscation algorithms is adequate to protect the data artifacts from unauthorized users by implementing the process flows described herein. In this regard, the system may be configured to iteratively implement the one or more alternate obfuscation algorithms on the one or more data artifacts, and determine whether their implementation is adequate to protect the data artifacts from unauthorized users until the similarity index between the first set of patterns and the second set of patterns meets the requirements of the predetermined threshold. As described herein, depending on the type of machine learning technique and/or similarity measure used, the results, and subsequent actions based on comparing the similarity index with the predetermined threshold may vary.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 12021US1.014033.3958 | To be assigned | SYSTEM FOR IDENTIFICATION OF OBFUSCATED ELECTRONIC DATA THROUGH PLACEHOLDER INDICATORS | Concurrently herewith |
| 12024US1.014033.3960 | To be assigned | SYSTEM FOR ELECTRONIC DATA OBFUSCATION THROUGH ALTERATION OF DATA FORMAT | Concurrently herewith |
| 12025US1.014033.3961 | To be assigned | SYSTEM FOR SECURE OBFUSCATION OF ELECTRONIC DATA WITH DATA FORMAT PRESERVATION | Concurrently herewith |
| 12026US1.014033.3963 | To be assigned | SYSTEM FOR IMPLEMENTING MULTI-DIMENSIONAL DATA OBFUSCATION | Concurrently herewith |

What is claimed is:

1. A system for implementing dynamic data obfuscation using pattern recognition techniques, the system comprising:
a processor; and
a non-transitory storage device containing instructions that, when executed by the processor, cause the processor to:
electronically receive, from a first database, one or more data artifacts;
electronically receive, from an obfuscated first database, one or more masked data artifacts, wherein the one or more masked data artifacts are the one or more data artifacts that have been masked using one or more obfuscation algorithms;
initiate one or more machine learning algorithms on the one or more data artifacts;
determine, using the one or more machine learning algorithms, a first set of patterns associated with the one or more data artifacts;
initiate the one or more machine learning algorithms on the one or more masked data artifacts;
determine, using the one or more machine learning algorithms, a second set of patterns associated with the one or more masked data artifacts;
determine a similarity index between the first set of patterns and the second set of patterns;
compare the similarity index with a predetermined threshold;
determine one or more alternate data obfuscation algorithms based on at least comparing the similarity index with the predetermined threshold; and
iteratively implement the one or more alternate data obfuscation algorithms on the one or more data artifacts until the similarity index between the first set of patterns and the second set of patterns generated in response to each iterative implementation of the one or more alternate data obfuscation algorithms on the one or more data artifacts is greater than the predetermined threshold.

2. The system of claim 1, wherein the instructions, when executed, cause the processor to:
implement one or more data obfuscation algorithms on the one or more data artifacts, wherein implementing further comprises obfuscating the one or more data artifacts to generate one or more masked data artifacts.

3. The system of claim 2, wherein the instructions, when executed, cause the processor to:
initiate the one or more machine learning algorithms on the one or more data artifacts, wherein each of the one or more data artifacts comprises at least a data record, metadata, data boot structure, and one or more data indexes;
classify, using the one or more machine learning algorithms, the one or more data artifacts into one or more class labels; and
determine the first set of patterns associated with the one or more data artifacts based on at least classifying the one or more data artifacts into the one or more class labels.

4. The system of claim 3, wherein the instructions, when executed, cause the processor to:
initiate the one or more machine learning algorithms on the one or more masked data artifacts;
classify, using the one or more machine learning algorithms, the one or more masked data artifacts into the one or more class labels; and
determine the second set of patterns associated with the one or more data artifacts based on at least classifying the one or more masked data artifacts into the one or more class labels.

5. The system of claim 4, wherein the instructions, when executed, cause the processor to:
initiate the one or more machine learning algorithms on the one or more data artifacts;
classify, using the one or more machine learning algorithms, the one or more data artifacts into one or more cluster groups; and
determine the first set of patterns associated with the one or more data artifacts based on at least classifying the one or more data artifacts into the one or more cluster groups.

6. The system of claim 5, wherein the instructions, when executed, cause the processor to:
initiate the one or more machine learning algorithms on the one or more masked data artifacts;
classify, using the one or more machine learning algorithms, the one or more masked data artifacts into one or more cluster groups; and
determine the first set of patterns associated with the one or more masked data artifacts based on at least classifying the one or more masked data artifacts into the one or more cluster groups.

7. A computer program product for implementing dynamic data obfuscation using pattern recognition techniques, the computer program product comprising a non-transitory computer-readable medium comprising code causing a first apparatus to:
electronically receive, from a first database, one or more data artifacts;
electronically receive, from an obfuscated first database, one or more masked data artifacts, wherein the one or more masked data artifacts are the one or more data artifacts that have been masked using one or more obfuscation algorithms;
initiate one or more machine learning algorithms on the one or more data artifacts;
determine, using the one or more machine learning algorithms, a first set of patterns associated with the one or more data artifacts;
initiate the one or more machine learning algorithms on the one or more masked data artifacts;
determine, using the one or more machine learning algorithms, a second set of patterns associated with the one or more masked data artifacts;
determine a similarity index between the first set of patterns and the second set of patterns;
compare the similarity index with a predetermined threshold;
determine one or more alternate data obfuscation algorithms based on at least comparing the similarity index with the predetermined threshold; and
iteratively implement the one or more alternate data obfuscation algorithms on the one or more data artifacts until the similarity index between the first set of patterns and the second set of patterns generated in response to each iterative implementation of the one or more alternate data obfuscation algorithms on the one or more data artifacts is greater than the predetermined threshold.

8. The computer program product of claim 7, wherein the code further causes the first apparatus to:
implement one or more data obfuscation algorithms on the one or more data artifacts, wherein implementing further comprises obfuscating the one or more data artifacts to generate one or more masked data artifacts.

9. The computer program product of claim 8, wherein the code further causes the first apparatus to:
initiate the one or more machine learning algorithms on the one or more data artifacts, wherein each of the one or more data artifacts comprises at least a data record, metadata, data boot structure, and one or more data indexes;
classify, using the one or more machine learning algorithms, the one or more data artifacts into one or more class labels; and
determine the first set of patterns associated with the one or more data artifacts based on at least classifying the one or more data artifacts into the one or more class labels.

10. The computer program product of claim 9, wherein the code further causes the first apparatus to:
initiate the one or more machine learning algorithms on the one or more masked data artifacts;
classify, using the one or more machine learning algorithms, the one or more masked data artifacts into the one or more class labels; and
determine the second set of patterns associated with the one or more data artifacts based on at least classifying the one or more masked data artifacts into the one or more class labels.

11. The computer program product of claim 10, wherein the code further causes the first apparatus to:
initiate the one or more machine learning algorithms on the one or more data artifacts;
classify, using the one or more machine learning algorithms, the one or more data artifacts into one or more cluster groups; and
determine the first set of patterns associated with the one or more data artifacts based on at least classifying the one or more data artifacts into the one or more cluster groups.

12. The computer program product of claim 11, wherein the code further causes the first apparatus to:

initiate the one or more machine learning algorithms on the one or more masked data artifacts;

classify, using the one or more machine learning algorithms, the one or more masked data artifacts into one or more cluster groups; and determine the first set of patterns associated with the one or more masked data artifacts based on at least classifying the one or more masked data artifacts into the one or more cluster groups.

13. A method for implementing dynamic data obfuscation using pattern recognition techniques, the method comprising:

electronically receiving, from a first database, one or more data artifacts;

electronically receiving, from an obfuscated first database, one or more masked data artifacts, wherein the one or more masked data artifacts are the one or more data artifacts that have been masked using one or more obfuscation algorithms;

initiating one or more machine learning algorithms on the one or more data artifacts;

determining, using the one or more machine learning algorithms, a first set of patterns associated with the one or more data artifacts;

initiating the one or more machine learning algorithms on the one or more masked data artifacts;

determining, using the one or more machine learning algorithms, a second set of patterns associated with the one or more masked data artifacts;

determining a similarity index between the first set of patterns and the second set of patterns;

comparing the similarity index with a predetermined threshold;

determining one or more alternate data obfuscation algorithms based on at least comparing the similarity index with the predetermined threshold; and iteratively implementing the one or more alternate data obfuscation algorithms on the one or more data artifacts until the similarity index between the first set of patterns and the second set of patterns generated in response to each iterative implementation of the one or more alternate data obfuscation algorithms on the one or more data artifacts is greater than the predetermined threshold.

14. The method of claim 13, wherein the method further comprises:

implementing one or more data obfuscation algorithms on the one or more data artifacts, wherein implementing further comprises obfuscating the one or more data artifacts to generate one or more masked data artifacts.

15. The method of claim 14, wherein the method further comprises:

initiating the one or more machine learning algorithms on the one or more data artifacts, wherein each of the one or more data artifacts comprises at least a data record, metadata, data boot structure, and one or more data indexes;

classifying, using the one or more machine learning algorithms, the one or more data artifacts into one or more class labels; and determining the first set of patterns associated with the one or more data artifacts based on at least classifying the one or more data artifacts into the one or more class labels.

16. The method of claim 15, wherein the method further comprises:

initiating the one or more machine learning algorithms on the one or more masked data artifacts;

classifying, using the one or more machine learning algorithms, the one or more masked data artifacts into the one or more class labels; and determining the second set of patterns associated with the one or more data artifacts based on at least classifying the one or more masked data artifacts into the one or more class labels.

17. The method of claim 16, wherein the method further comprises:

initiating the one or more machine learning algorithms on the one or more data artifacts;

classifying, using the one or more machine learning algorithms, the one or more data artifacts into one or more cluster groups; and determining the first set of patterns associated with the one or more data artifacts based on at least classifying the one or more data artifacts into the one or more cluster groups.

* * * * *